(12) United States Patent
Dar et al.

(10) Patent No.: US 11,750,721 B2
(45) Date of Patent: *Sep. 5, 2023

(54) BIDIRECTIONAL COMMAND PROTOCOL VIA A UNIDIRECTIONAL COMMUNICATION CONNECTION FOR RELIABLE DISTRIBUTION OF TASKS

(71) Applicant: VMware, Inc., Palo Alto, CA (US)

(72) Inventors: Sufian A. Dar, Bothell, WA (US); Sudershan Bhandari, Westford, MA (US); James W. Cooley, Seattle, WA (US)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/510,142

(22) Filed: Oct. 25, 2021

(65) Prior Publication Data

US 2022/0210245 A1 Jun. 30, 2022

Related U.S. Application Data

(63) Continuation of application No. 16/047,755, filed on Jul. 27, 2018, now Pat. No. 11,190,614.

(51) Int. Cl.
*H04L 67/60* (2022.01)
*H04L 67/10* (2022.01)
(Continued)

(52) U.S. Cl.
CPC .............. *H04L 67/60* (2022.05); *H04L 67/01* (2022.05); *H04L 67/10* (2013.01); *H04L 67/141* (2013.01); *H04L 67/55* (2022.05)

(58) Field of Classification Search
CPC ......... H04L 67/01; H04L 67/10; H04L 67/55; H04L 67/60; H04L 67/63; H04L 67/141; H04L 47/70; G06F 8/60; G06F 9/46
(Continued)

(56) References Cited

U.S. PATENT DOCUMENTS 6,047,323 A 4/2000 Krause
7,139,811 B2 * 11/2006 Lev Ran ............... H04L 67/563
709/213

(Continued)

OTHER PUBLICATIONS

Final Office Action received for U.S. Appl. No. 16/047,755, dated Oct. 13, 2020, 42 pages.

(Continued)

*Primary Examiner* — James N Fiorillo
(74) *Attorney, Agent, or Firm* — DLA Piper LLP (US)

(57) ABSTRACT

The present disclosure relates to techniques for handling of bidirectional command protocols via a unidirectional communication connection established between a client computing environment and a cloud-services computing environment. In one embodiment, a command request message is pushed from a service component of the cloud-services computing environment to a client gateway of the client computing environment via the unidirectional communication connection. A token indicating routing information to the service component is embedded in the pushed command request message. A command response message is received at the cloud gateway from the client gateway via a bidirectional communication connection established between the client computing environment and the cloud-services computing environment. The command response message includes the token and data associated with executing the command request message at the client computing environment. Based on the token, the command response message is routed to the service component.

28 Claims, 7 Drawing Sheets

(51) Int. Cl.
  *H04L 67/141* (2022.01)
  *H04L 67/01* (2022.01)
  *H04L 67/55* (2022.01)
(58) Field of Classification Search
  USPC .......................................................... 709/203
  See application file for complete search history.

(56) References Cited

U.S. PATENT DOCUMENTS

| | | | |
|---|---|---|---|
| 8,817,777 | B2 | 8/2014 | Manian et al. |
| 10,466,933 | B1 | 11/2019 | Bysani Venkata Naga et al. |
| 2008/0031230 | A1 | 2/2008 | Kacher et al. |
| 2012/0323990 | A1* | 12/2012 | Hayworth ........... H04L 67/1095 709/203 |
| 2013/0007183 | A1 | 1/2013 | Sorenson et al. |
| 2013/0039360 | A1 | 2/2013 | Manian et al. |
| 2013/0061046 | A1* | 3/2013 | Joy ..................... H04L 12/1859 713/168 |
| 2013/0198266 | A1 | 8/2013 | Kiley et al. |
| 2015/0188949 | A1 | 7/2015 | Mahaffey et al. |
| 2015/0281181 | A1 | 10/2015 | Albisu |
| 2015/0319226 | A1 | 11/2015 | Mahmood |
| 2016/0088022 | A1 | 3/2016 | Handa et al. |
| 2016/0241633 | A1 | 8/2016 | Overby et al. |
| 2016/0344841 | A1 | 11/2016 | Wang et al. |
| 2016/0373445 | A1 | 12/2016 | Hayton et al. |
| 2017/0006006 | A1 | 1/2017 | Rawcliffe et al. |
| 2017/0006030 | A1 | 1/2017 | Krishnamoorthy et al. |
| 2017/0063968 | A1* | 3/2017 | Kitchen .............. H04L 65/1033 |
| 2017/0111452 | A1* | 4/2017 | Thazhathethil ..... H04L 41/0803 |
| 2017/0257257 | A1 | 9/2017 | Dawes et al. |
| 2017/0264649 | A1* | 9/2017 | Sonar .................... G06F 13/387 |
| 2018/0007002 | A1 | 1/2018 | Landgraf |
| 2018/0041437 | A1 | 2/2018 | Nishijima et al. |
| 2018/0084073 | A1 | 3/2018 | Walsh et al. |
| 2018/0091391 | A1 | 3/2018 | Turow et al. |
| 2018/0091621 | A1 | 3/2018 | Kuo et al. |
| 2018/0167476 | A1 | 6/2018 | Hoffner et al. |
| 2018/0246944 | A1 | 8/2018 | Yelisetti et al. |
| 2019/0132329 | A1 | 5/2019 | Verberkt et al. |
| 2019/0306242 | A1* | 10/2019 | Thummalapalli ... H04L 41/0806 |
| 2020/0036773 | A1 | 1/2020 | Dar et al. |
| 2020/0036811 | A1 | 1/2020 | Dar et al. |
| 2021/0273990 | A1 | 9/2021 | Dar et al. |

OTHER PUBLICATIONS

Non-Final Office Action received for U.S. Appl. No. 16/047,755, dated Feb. 12, 2021, 38 pages.

Non-Final Office Action received for U.S. Appl. No. 16/047,755, dated Jan. 16, 2020, 33 pages.

Non-Final Office Action received for U.S. Appl. No. 16/047,968, dated Aug. 19, 2020, 10 pages.

Notice of Allowance received for U.S. Appl. No. 16/047,968, dated Jan. 22, 2021, 8 pages.

Pasquier et al., "CamFlow: Managed Data-Sharing for Cloud Services", IEEE Transactions on Cloud Computing, vol. 5, No. 3, 2015, pp. 472-484.

Rekik et al., "A Comprehensive Framework for Business Process Outsourcing to the Cloud", IEEE International Conference on Services Computing (SCC), 2016, pp. 179-186.

* cited by examiner

Process
500
(cont.)

(A)

512
In accordance with a determination that the unidirectional communication connection is open, push the command message to the client component via the unidirectional communication connection, the command message including an embedded token indicating routing information to the service component.

514
Determine state of the unidirectional communication connection.

516
In accordance with a determination, at a first time, that the state of the unidirectional communication connection is open, send the command message to a first gateway node of the cloud gateway.

518
In accordance with a determination, at the first time, that the state of the unidirectional communication connection is not open, store the command message.

520
upon detecting, at a second time after the first time, a change in the state of the unidirectional communication connection from not open to open, send the stored command message to the first gateway node.

522
Send the command message from the first gateway node to the client gateway.

524
Receive, at the cloud gateway via the bidirectional communication connection, an command response message from the client gateway, the command response message including the token and data associated with executing the command message at the client computing environment.

526
Send, based on the token, the command response message to the service component.

FIG. 5B

BIDIRECTIONAL COMMAND PROTOCOL VIA A UNIDIRECTIONAL COMMUNICATION CONNECTION FOR RELIABLE DISTRIBUTION OF TASKS

CROSS-REFERENCES TO RELATED APPLICATIONS

This application is a continuation of U.S. patent application Ser. No. 16/047,755, entitled "BIDIRECTIONAL COMMAND PROTOCOL VIA A UNIDIRECTIONAL COMMUNICATION CONNECTION FOR RELIABLE DISTRIBUTION OF TASKS", filed Jul. 27, 2018, and relates to U.S. patent application Ser. No. 16/047,968, entitled "SECURE MULTI-DIRECTIONAL DATA PIPELINE FOR DATA DISTRIBUTION SYSTEMS," filed on Jul. 27, 2018, the content of which are incorporate by reference herein in their entirety for all purposes.

FIELD

The present disclosure relates generally to data distribution pipelines in distributed-computing systems and, more specifically, to handling bidirectional command protocols via a unidirectional communication connection across different computing environments.

BACKGROUND

Cloud computing is a model of service delivery that enables convenient, on-demand network access to a shared pool of configurable computing resources (e.g. networks, network bandwidth, servers, processing, memory, storage, applications, virtual machines, services, etc.). For example, a cloud computing provider can deliver computing services to a customer's computing environment through the Internet. Such delivery of computing services can require the exchange of data messages (e.g., in real time) between a cloud-services computing environment providing the computing services and a client computing environment utilizing the computing services. The data messages can include, for example, ingestion requests associated with ingesting large volumes of customer data at the cloud-services computing environment. The data messages can also include, for example, command requests associated with performing remote management tasks at the client computing environment. The timeliness (e.g., latency) and reliability of distributing such data messages across the computing environments can significantly impact customer operations. Thus, improved techniques for distributing data messages between computing environments in a fast, secure, and reliable manner can be desirable.

SUMMARY

Described herein are techniques for handling bidirectional command protocols via a unidirectional communication connection between a client computing environment and a cloud-services computing environment. In one embodiment, in response to receiving one or more connection requests initiated by a client gateway of the client computing environment, a unidirectional communication connection and a bidirectional communication connection are established between the client gateway and a cloud gateway of the cloud-services computing environment. A command request message directed to a client component of the client computing environment is generated by a service component of the cloud-services computing environment. In accordance with determining that the unidirectional communication connection is open, the command request message is pushed from the service component to the client gateway via the unidirectional communication connection. A token indicating routing information to the service component is embedded in the command request message. A command response message is received at the cloud gateway from the client gateway via the bidirectional communication connection. The command response message includes the token and data associated with executing the command request message at the client computing environment. Based on the token, the command response message is sent to the service component.

BRIEF DESCRIPTION OF THE DRAWINGS

FIGS. 5A-5B illustrate a flowchart of a process for handling bidirectional command protocols via a unidirectional communication connection across different computing environments, according to some embodiments.

DETAILED DESCRIPTION

Figure 1B:
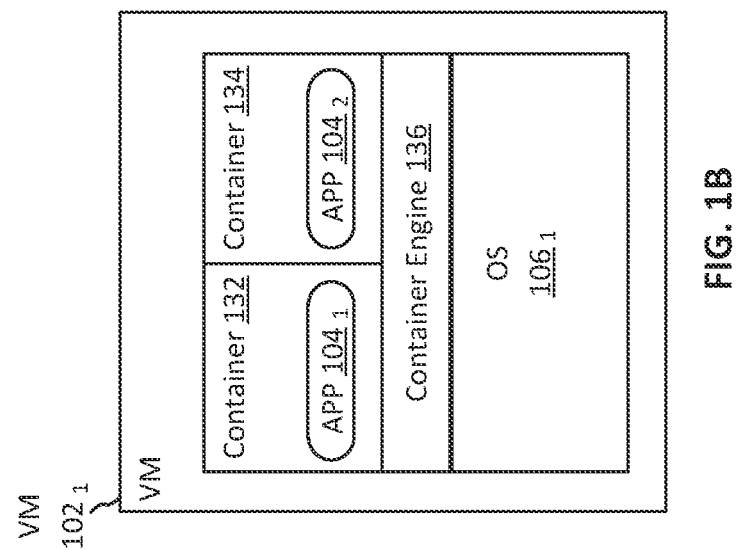
FIG. 1B is a block diagram illustrating a containerized application framework for implementing various components of a distributed-computing system, in accordance with some embodiments.

The following description sets forth exemplary methods, systems, and the like. It should be recognized, however, that such description is not intended as a limitation on the scope of the present disclosure, but is instead provided as a description of exemplary embodiments.

As discussed above, utilizing cloud computing services can require data messages to be exchanged (e.g., in real time and at a high frequency) between a cloud-services computing environment and a client computing environment. For example, it may be necessary to push command messages from the cloud-services computing environment to the client computing environment to perform various tasks, such as data queries, administrative tasks, or the like. However, security features (e.g., enterprise firewalls) implemented at the client computing environment can create challenges in pushing command messages from the cloud-services computing environment to the client computing environment. For example, the client computing environment can block incoming request messages initiated by the cloud-services computing environment.

The present disclosure provides techniques for enabling command request messages initiated by service components of the cloud-services computing environment to be delivered to the client computing environment in a fast, reliable, and secure manner. The techniques further enable command response messages associated with executing the delivered command request messages to be returned to the appropriate service components in a similarly fast, reliable, and secure manner. The techniques are implemented using respective gateways in the cloud-services computing environment and the client computing environment. In particular, the gateways enable secure communication connections to be established between the cloud-services computing environment and the client computing environment. The gateways also manage the reliable distribution of messages across the communication connections via the established communication connections. In one embodiment, in response to receiving one or more connection requests initiated by a client gateway of the client computing environment, a unidirectional communication connection and a bidirectional communication connection are established between the client gateway and a cloud gateway of the cloud-services computing environment. In this embodiment, the unidirectional communication connection permits messages initiated at the cloud-services computing environment to be pushed from the cloud gateway to the client gateway, but does not permit response messages to be returned from the client gateway to the cloud gateway. Additionally, in this embodiment, the bidirectional communication connection permits messages initiated at the client computing environment to be pushed from the client gateway to the cloud gateway and further permits responses to those messages to be returned from the cloud gateway to the client gateway. However, the bidirectional communication connection does not permit messages initiated at the cloud-services computing environment to be pushed from the cloud gateway to the client gateway. A command request message directed to a client component of the client computing environment is generated by a service component of the cloud-services computing environment. In accordance with determining that the unidirectional communication connection is open, the command request message is pushed from the service component to the client gateway via the unidirectional communication connection. A token indicating routing information to the service component is embedded in the command request message. A command response message is received at the cloud gateway from the client gateway via the bidirectional communication connection. The command response message includes the token and data associated with executing the command request message at the client computing environment. The token in the command response message is, for example, the same token embedded in the command request message. The token provides routing information, which enables the command response message to be reliably routed back to the service component. Based on the token, the command response message is sent to the service component. The command response message completes the request-response protocol at the service component.

Figure 1A:
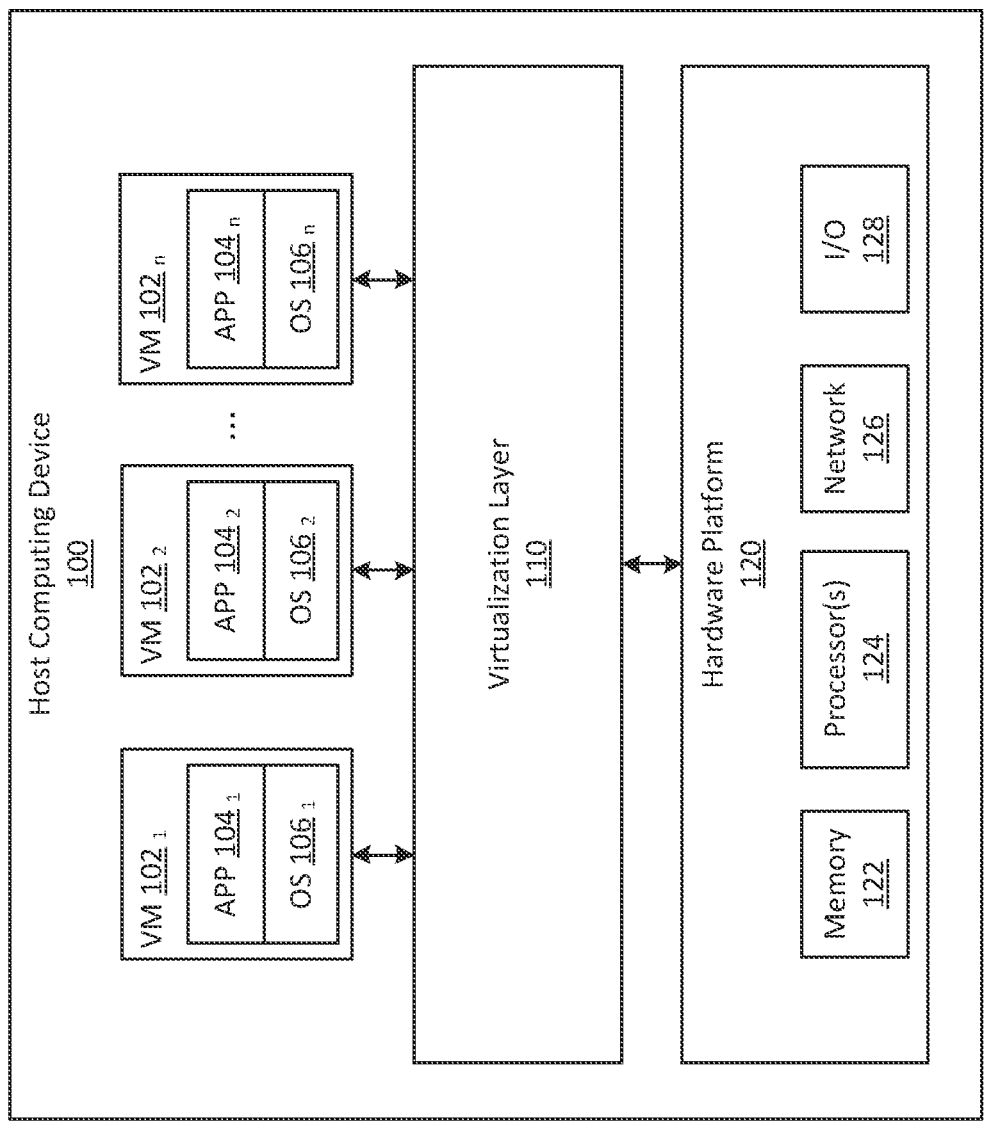
FIG. 1A is a block diagram illustrating a system and environment for implementing various components of a distributed-computing system, in accordance with some embodiments.

FIG. 1A is a block diagram illustrating a system and environment for implementing various components of a distributed-computing system, according to some embodiments. As shown in FIG. 1, virtual machines (VMs) $102_1$, $102_2 \ldots 120_n$ are instantiated on host computing device 100. In some embodiments, host computing device 100 implements one or more elements of a distributed-computing system (e.g., a distributed-computing system operating in a client computing environment and/or a cloud-services computing environment described with reference to FIG. 2). Hardware platform 120 includes memory 122, one or more processors 124, network interface 126, and various I/O devices 128. Memory 122 includes computer-readable storage medium. The computer-readable storage medium is, for example, tangible and non-transitory. For example, memory 122 includes high-speed random access memory and also includes non-volatile memory, such as one or more magnetic disk storage devices, flash memory devices, or other non-volatile solid-state memory devices. In some embodiments, the computer-readable storage medium of memory 122 stores instructions for performing the methods and processes described herein. In some embodiments, hardware platform 120 also includes other components, including power supplies, internal communications links and busses, peripheral devices, controllers, and many other components.

Virtualization layer 110 is installed on top of hardware platform 120. Virtualization layer 110, also referred to as a hypervisor, is a software layer that provides an execution environment within which multiple VMs 102 are concurrently instantiated and executed. The execution environment of each VM 102 includes virtualized components analogous to those comprising hardware platform 120 (e.g. a virtualized processor(s), virtualized memory, etc.). In this manner, virtualization layer 110 abstracts VMs 102 from physical hardware while enabling VMs 102 to share the physical resources of hardware platform 120. As a result of this abstraction, each VM 102 operates as though it has its own dedicated computing resources.

Each VM 102 includes operating system (OS) 106, also referred to as a guest operating system, and one or more applications (Apps) 104 running on or within OS 106. OS 106 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components. As in a traditional computing environment, OS 106 provides the interface between Apps 104 (i.e. programs containing software code) and the hardware resources used to execute or run applications. However, in this case the "hardware" is virtualized or emulated by virtualization layer 110. Consequently, Apps 104 generally operate as though they are in a traditional computing environment. That is, from the perspective of Apps 104, OS 106 appears to have access to dedicated hardware analogous to components of hardware platform 120.

FIG. 1B is a block diagram illustrating a containerized application framework for implementing various components of a distributed-computing system, in accordance with some embodiments. More specifically, FIG. 1B illustrates VM $102_1$ implementing a containerized application framework. Containerization provides an additional level of abstraction for applications by packaging a runtime environment with each individual application. Container 132 includes App $104_1$ (i.e., application code), as well as all the dependencies, libraries, binaries, and configuration files needed to run App $104_1$. Container engine 136, similar to virtualization layer 110 discussed above, abstracts App $104_1$ from OS 106₁, while enabling other applications (e.g., App 104₂) to share operating system resources (e.g., the operating system kernel). As a result of this abstraction, each App 104 runs the same regardless of the environment (e.g., as though it has its own dedicated operating system). In some embodiments, a container (e.g., container 132 or 134) includes a gateway application or process (e.g., client gateway 332 described below with reference to FIG. 3A or cloud gateway 340 described below with reference to FIG. 3B), as well as all the dependencies, libraries, binaries, and configuration files needed to run the gateway applications.

It should be appreciated that applications (Apps) and/or gateways implementing aspects of the present disclosure are, in some embodiments, implemented as applications running within traditional computing environments (e.g., applications run on an operating system with dedicated physical hardware), virtualized computing environments (e.g., applications run on a guest operating system on virtualized hardware), containerized environments (e.g., applications packaged with dependencies and run within their own runtime environment), distributed-computing environments (e.g., applications run on or across multiple physical hosts) or any combination thereof. Furthermore, while specific implementations of virtualization and containerization are discussed, it should be recognized that other implementations of virtualization and containers can be used without departing from the scope of the various described embodiments.

Figure 2:
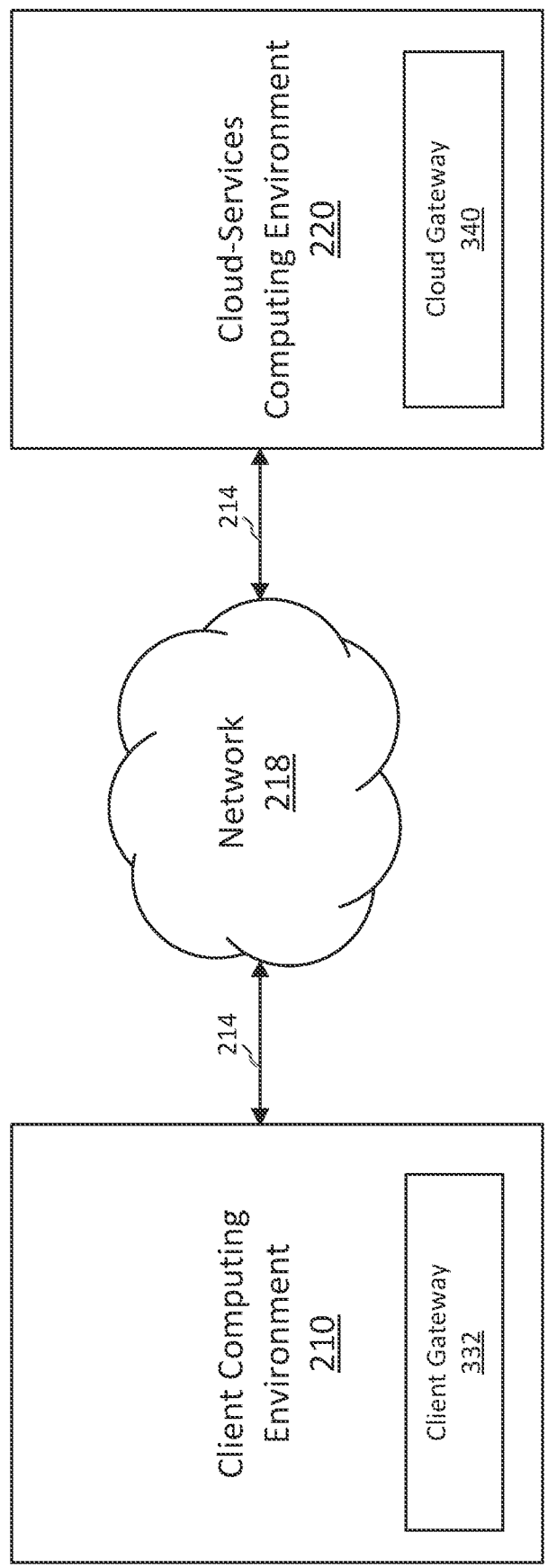
FIG. 2 illustrates systems and environments for establishing secure communication connections between a client computing environment and a cloud-services computing environment, in accordance with some embodiments.

FIG. 2 is a block diagram illustrating systems and environments for establishing one or more secure communication connections between client computing environment 210 and cloud-services computing environment 220, in accordance with some embodiments. Client computing environment 210 is an on-premise customer network 202 (e.g., private network) that is formed from resources (e.g., networked systems and devices) owned and under the control of an entity (e.g., a corporation or enterprise customer). The entity can provide an authorized group of users (e.g., employees and administrators) access to client computing environment 210 to perform various networked computing tasks.

Cloud-services computing environment 220 is a public or private network that is formed from resources owned and under the control of a different entity (e.g., a corporation providing cloud services). Cloud-services computing environment 220 is configured to deliver various cloud services to client computing environment 210 via network 218 (e.g., Internet). For example, cloud-services computing environment 220 provides software, platform, or infrastructure services to client computing environment 210. In some examples, client computing environment 210 and cloud-services computing environment 220 are separate networks that do not overlap.

As shown in FIG. 2, client computing environment 210 and cloud-services computing environment 220 include respective gateways (client gateway 332 and cloud gateway 340) configured to facilitate communication between the two environments. For example, client gateway 332 and cloud gateway 340 are configured to establish one or more secure communication connections 214 with each other to enable fast, reliable, and secure exchange of data messages between client computing environment 210 and cloud-services computing environment 220. The one or more communication connections 214 can be used to provide cloud services to client computing environment 210. For example, as discussed in greater detail below with reference to FIGS. 3A-3B, data streams associated with data ingestion services can be transmitted through the one or more communication connections 214. Additionally or alternatively, as discussed in greater detail below with reference to FIGS. 4 and 5, command requests for performing remote management tasks can also be transmitted through the one or more communication connections 214.

In some embodiments, the one or more communication connections 214 include one or more bidirectional communication connections that support request-response protocols (e.g., hypertext transfer protocol (HTTP), HTTP/2, TCP/IP, etc.). The bidirectional communication connections are, for example, persistent connections (e.g., HTTP persistent connection or HTTP keep-alive) that do not close after each request-response pair is completed. In some embodiments, the bidirectional communication connections support the transmitting of data streams from client computing environment 210 to cloud-services computing environment 220. For example, client gateway 332 send ingestion request messages from client computing environment 210 to cloud-services computing environment 220 via the one or more bidirectional communication connections. In response, cloud gateway 340 returns corresponding acknowledgement and/or delivery status response messages from cloud-services computing environment 220 to client computing environment 210 via the one or more bidirectional communication connections.

In some embodiments, the one or more communication connections 214 include one or more unidirectional communication connections (e.g., server-sent events (SSE) sessions). The one or more unidirectional communication connections, for example, permit the transmission of data in only one direction. In some embodiments, the one or more unidirectional communication connections support, for example, the transmitting of command messages from cloud-services computing environment 220 to client computing environment 210. For example, cloud gateway 340 sends command request messages from cloud-services computing environment 220 to client computing environment 210 via the one or more unidirectional communication connections. In response, client gateway 332 can return corresponding command response messages from client computing environment 210 to cloud-services computing environment 220 via the one or more bidirectional communication connections (not via the one or more unidirectional communication connections). The command response messages include, for example, data associated with executing the command request messages in client computing environment 210.

In some embodiments, the client computing environment 210 operates behind a firewall. The firewall is implemented, for example, by client gateway 332. For example, client gateway 332 blocks or filters unauthorized communications that are initiated by an external computing environment (e.g., cloud-services computing environment 220) and received via the one or more communication connections 214. Client gateway 332 also denies external requests to establish a communication connection. In some embodiments, client gateway 332 does not have any public Internet Protocol (IP) addresses or ports at which external computer environments can establish communication connections.

In some embodiments, prior to establishing the one or more communication connections 214, client gateway 332 is required to be pre-registered with cloud gateway 340. For example, at start-up, client gateway 332 provides cloud gateway 340 identification information (e.g., IP addresses, credentials such as user names and passwords), the tenant system(s) it is associated with, the type of agent it is (e.g., a client gateway instead of a service agent), or the like. As described in greater detail below with reference to FIG. 3A, a tenant system can include or access one or more associated data sources. In some embodiments, client gateway 332 is authenticated by cloud gateway 340 using various key authentication techniques, including symmetric or asymmetric authentication cryptography techniques. In some embodiments, secure communication connections are established between client gateway 332 operating in client computing environment 210 and cloud gateway 340 operating in cloud-services computing environment 220 based on client gateway 332's pre-registration and key authentication techniques. In some embodiments, client gateway 332 performs authentication in response to an authentication request from cloud gateway 340 operating in cloud-services computing environment.

In some embodiments, client gateway 332 and cloud gateway 340 are each implemented by one or more containers (e.g., container 132 or 134), VMs (e.g., VM $102_1$), or host computing devices (e.g., host computing device 100) in the respective computing environments (210 and 220). The functions of client gateway 332 and cloud gateway 340 are described in greater detail below with reference to FIGS. 3A and 3B.

Figure 3A:
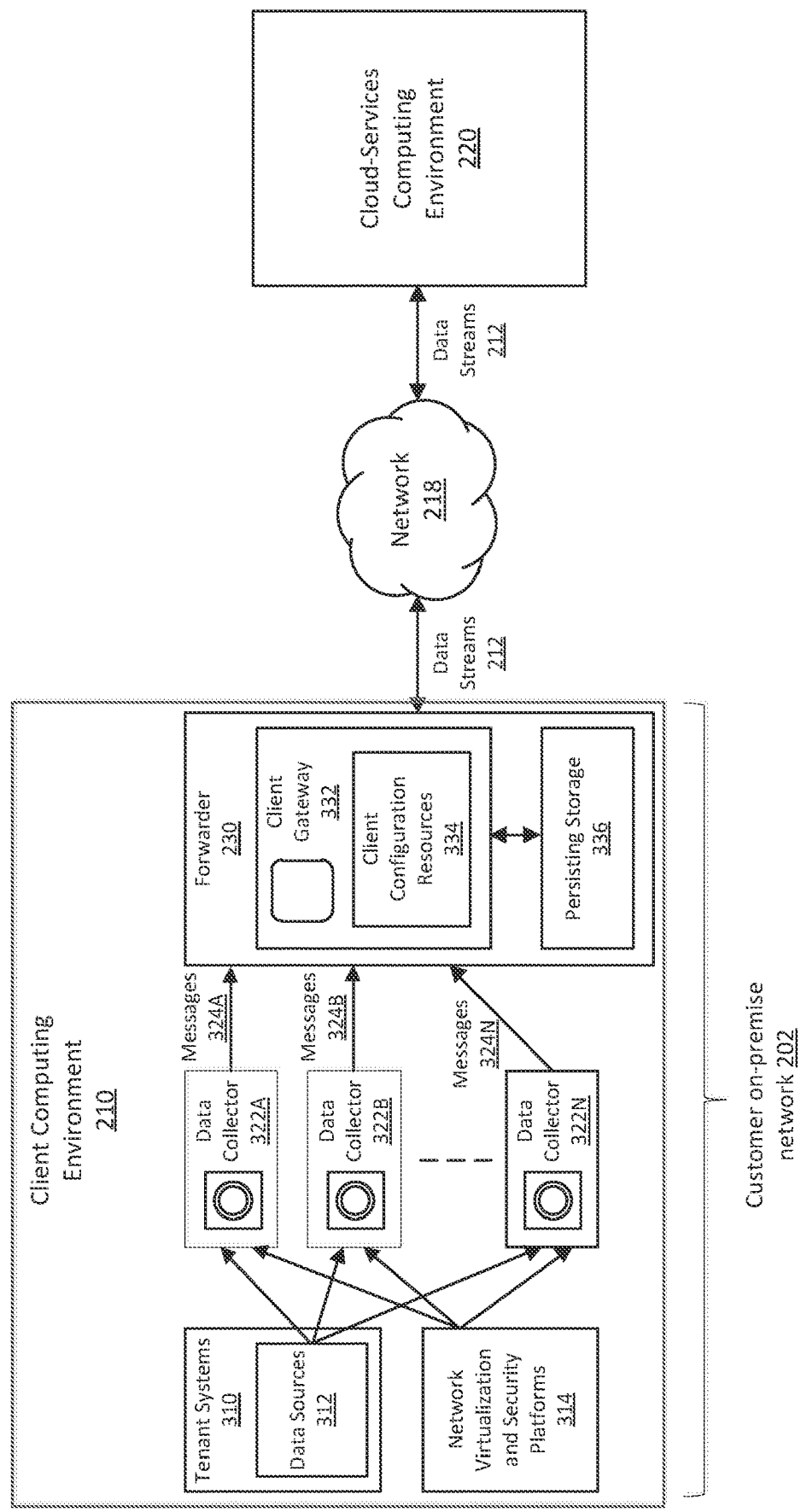
FIG. 3A is a block diagram illustrating systems and environments for collecting and aggregating data collected from multiple data sources and platforms operating in the client computing environment and ingesting data streams to the cloud-services computing environment, in accordance with some embodiments.

FIG. 3A is a block diagram illustrating systems and environment for collecting and aggregating data collected from multiple data sources and platforms operating in client computing environment 210 and ingesting data streams to the cloud-services computing environment 220, in accordance with some embodiments. As shown in FIG. 3A, in some embodiments, client computing environment 210 includes one or more data sources 312 associated with tenant systems 310, one or more network virtualization and security platforms 314, one or more data collectors 322A-N, a forwarder 230, a client gateway 332, client configuration resources 334, and a persisting storage 336. One or more systems of client computing environment 210 can be hardware, software, or a combination thereof. For example, the systems of client computing environment 210 shown in FIG. 3A can be implemented by one or more containers (e.g., container 132 or 134), VMs (e.g., VM $102_1$), host computing devices (e.g., host computing device 100), or any combination thereof.

As illustrated in FIG. 3A, tenant systems 310 includes or have access to one or more associated data sources 312. A tenant system can be a hardware, a software, or a combination thereof operated by or serving a tenant or client. For example, a tenant system includes one or more servers associated with a same tenant. In some embodiments, a tenant system is provided with ability to customize at least one aspect of one or more software applications running on the tenant system. For example, a tenant system can be enabled to customize a user interface (e.g., color, appearance, functionality, etc.) of a user terminal for communicating with one or more systems of client computing environment 210 or cloud-services computing environment 220. In some embodiments, one or more data sources 312 includes applications that generate data (e.g., log data), databases that store the generated data, and/or hardware storages. Data sources 312 can be included in tenant systems 310 (e.g., an application running on tenant systems 310) or be an internal/external application/storage that is accessible to tenant system 310. In some embodiments, a tenant system includes a hypervisor configured to abstract processors, memory, storage, and other resources into virtual machines (e.g., VM $102_{1-n}$ as described with reference to FIG. 1), a management plane configured to control data center services and provide access and control to host computing devices (e.g., host computing device 100), a user interface for managing the client computing environment 210, a virtual machine file system, utility tools, storage, etc.

With reference to FIG. 3A, data sources 312 associated with tenant systems 310 are communicatively coupled to one or more data collectors 322A-N (collectively as data collectors 322). A data collector is a hardware, a software agent, or a combination thereof. Data collectors 322 collect data from the data sources 312, optionally process the collected data, and deliver the data to client gateway 332. The data collected by one or more data collectors 322 includes, for example, a plurality of messages including log messages, application data, inventory information, or the like.

In some embodiments, data collectors 322 also collects data from network virtualization and security platforms 314. Network virtualization and security platforms 314 abstracts network operations from underlying hardware onto a distributed virtualization layer, similar to server virtualization of processors and operating systems. For example, network virtualization and security platforms 314 provides logic switching, routing, distributed firewalling, load balancing, virtual private networking, application programming interfaces, dynamic security management, log management, and/or other network and security operations. Data generated during these operations may need to be provided for analyzing and optimizing network and security performances, and therefore are provided to one or more data collectors 322, as illustrated in FIG. 3A.

In some embodiments, after one or more data collectors 322 receive data (e.g., messages) from data sources 312 and/or network virtualization and security platforms 314, data collector 322 forwards the data to client gateway 332 with or without further processing of the data. As an example, data collectors 322 forward the received messages to client gateway 332 associated with forwarder 230 without processing. As another example, data collectors 322 include one or more processing pipelines that process the received messages (e.g., extracting payloads, annotating payloads, categorizing payloads, or the like) and then forward the processed messages to client gateway 332 associated with forwarder 230.

As illustrated in FIG. 3A, client gateway 332 receives messages 324A-N (processed or unprocessed) from one or more of data collectors 322A-N, respectively, and assigns the messages to one or more data streams. A data stream can thus include a group or a sequence of messages with a particular order. In some embodiments, the order of the messages in a data stream is determined based on the order the messages are received at client gateway 332. In some embodiments, the order of the messages in a data stream is determined based on predetermined configurations such as priority configurations (e.g., a higher priority may be given to messages collected by a particular data source).

In some embodiments, messages 324A-N include information (e.g., a data file) identifying which data collectors collected, processed, and/or forwarded the messages. For example, a particular message forwarded by data collector 324A includes a data field (e.g., a header) indicating that the particular message is collected, processed, and/or forwarded by data collector 322A. In some embodiments, to assign a particular message to a data stream, client gateway 332 obtains, from the message, the information identifying the collector that collected, processed, and/or forwarded the particular message to client gateway 332. Based on the identification of the data collector associated with the particular message, client gateway 332 identifies a particular data stream associated with the particular data collector. In some embodiments, client gateway 332 performs this identification using predetermined collector-stream associations stored in, for example, client configuration resources 334. For example, a particular data stream is assigned a stream name or ID that is associated with a particular data collector. All messages collected by the particular data collector are assigned to the corresponding data stream. In some embodiments, assigning a particular message to a particular corresponding data stream includes associating a tag to the particular message. The tag, for example, uniquely identifies the particular data stream. As a result, all messages that belong to the same data stream are associated with a same tag.

In some embodiments, a data stream is further associated with and/or identified by the receivers/subscribers of the stream and/or the type of delivery policy to be used for delivering the data stream (e.g., asynchronous or synchronous delivery). The association of data streams with receivers/subscribers and delivery policies is described below in more detail with reference to FIG. 3B.

In some embodiments, the data streams generated by client gateway 332 (e.g., based on assigning messages to data streams) are further processed before they are delivered to one or more receivers operating in client computing environment 210 and/or cloud-services computing environment 220. As illustrated in FIG. 3A, forwarder 230 performs one or more of redacting, filtering, transforming, or obfuscating of the messages in a particular data stream before delivering the data stream to its receivers. For example, forwarder 230 redacts a message by suppressing, blocking, or removing sensitive data such as personal identifiable information included in the message. Forwarder 230 can also filter the plurality of messages in a data stream by suppressing, blocking, or removing messages that are not appropriate or required to be transmitted out of client computing environment 210 (e.g., confidential, sensitive, inappropriate content, etc., that are not appropriate to be transmitted out of the client's private network). Forwarder 230 can also change the format or otherwise transform the messages in a particular data stream to another form (e.g., different file format, content transformation, etc.). Forwarder 230 can also obfuscate messages by masking or obscuring them to enhance security. For example, a sensitive IP address may be replaced with 0.0.0.0 such that the source of the IP address cannot be identified.

In some embodiments, after client gateway 332 assigns messages received from data collectors 322A-N to one or more data streams, and the messages are optionally further processed, client gateway 332 obtains stream routing configurations for routing or delivering the data streams to their destinations. In some embodiments, client gateway 332 is configured such that a particular data stream is delivered not only to remote destinations within cloud-services computing environment 220 for performing cloud-based services (e.g., SaaS services) but also to on-premise destinations within client computing environment 210 for performing on-premise data analysis and services.

Figure 3B:
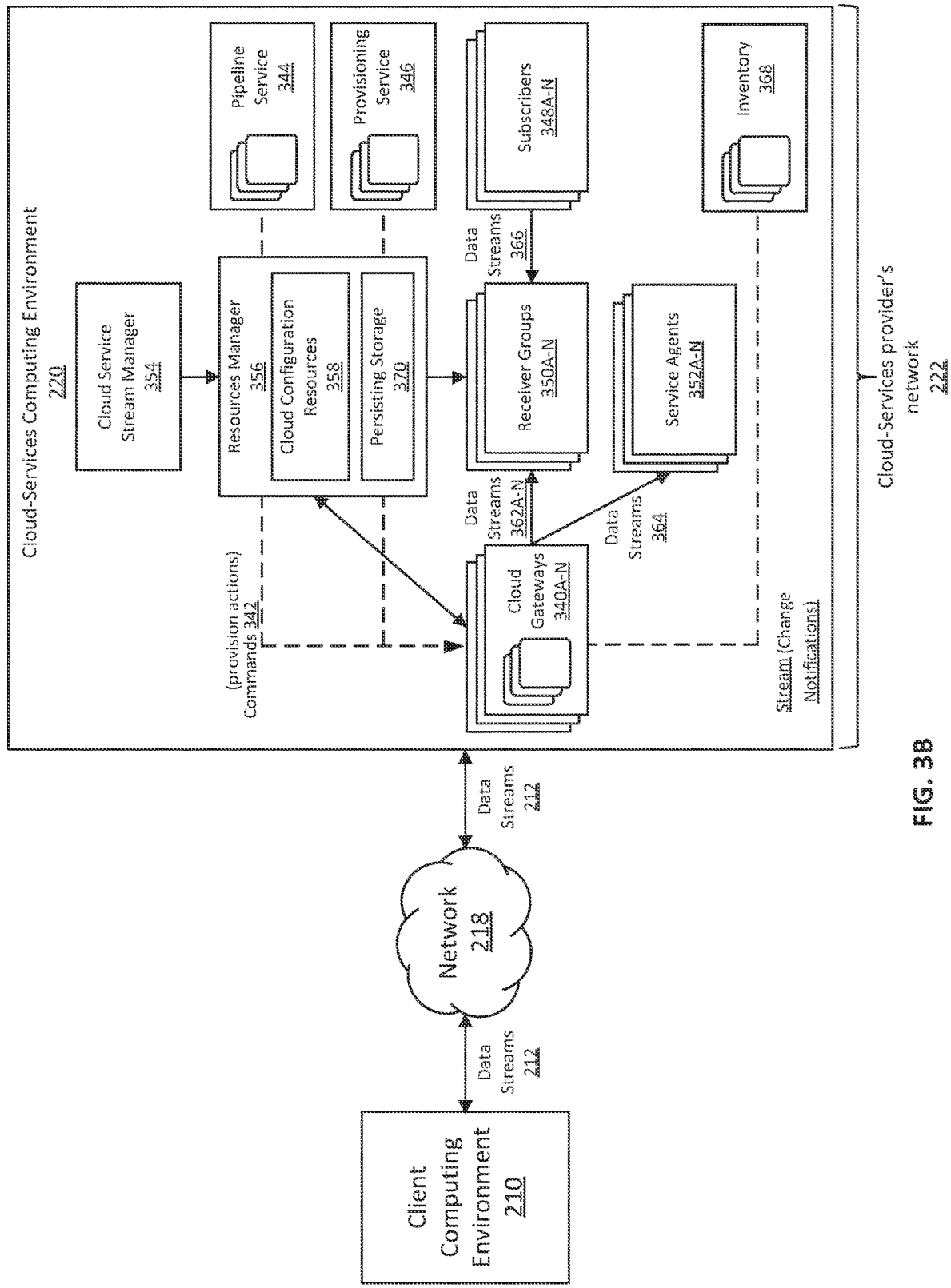
FIG. 3B is a block diagram illustrating systems and environments for distributing data streams to multiple receivers, agents, and services operating in the cloud-services computing environment, in accordance with some embodiments.

FIG. 3B is a block diagram illustrating systems and environment for distributing data streams to multiple receivers, agents, and services operating in cloud-services computing environment 220, in accordance with some embodiments. As described above, a client gateway operating in client computing environment 210 transmits data streams 212 to cloud-services computing environment 220 using a bidirectional data pipeline via network 218 (e.g., Internet).

As illustrated in FIG. 3B, cloud-services computing environment 220 includes one or more cloud gateway 340A-N, a cloud service stream manager 354, a resources manager 356, one or more receiver groups 350A-N (collectively as groups 350), one or more service agents 352A-N (collectively as 352), one or more cloud computing services (e.g., pipeline service 344, provisioning service 346, inventory 368), and one or more data stream subscribers 348A-N (collectively as subscribers 348). One or more systems or components of cloud-services computing environment 220 can be hardware, software, or a combination thereof. For example, the system and/or components of cloud-services computing environment 210 shown in FIG. 3A can be implemented by one or more containers (e.g., container 132 or 134), VMs (e.g., VM $102_1$), host computing devices (e.g., host computing device 100), or any combination thereof. As described above, cloud-services computing environment 220 includes a cloud-services provider's network 222, which may be a private or public network.

As illustrated in FIG. 3B, cloud gateway 340 receives data streams 212. A cloud gateway can be a data ingress gateway that distributes multiple data streams to multiple destinations. As described above, data streams 212 can include multiple data streams that are associated with respective data collectors. For example, data streams 212 include data streams 362A-N. Messages included in data streams 362A-N are collected by different data collectors operating in client computing environment 210. Different data collectors can collect messages from different data sources or platforms. Thus, data streams 362A-N can include messages collected from different data sources or platforms. As a result, data streams 362A-N may need to be delivered to different receivers or receiver groups (e.g., receiver groups 350A-N). A receiver is, for example, an uniform resource identifier (URI), a port, or a protocol for message delivery. A receiver group includes one or more receivers for receiving the same data stream. Different receivers in a same receiver group may be configured to store different topics of a particular data stream. Additionally, different receiver groups may be associated with different delivery policies.

In some embodiments, one or more messages in a data stream include path fields indicating the destination of the data stream. The destination is, for example, one or more receivers in a receiver group (e.g., receiver groups 350A-N) or one or more service agents (e.g., service agents 352A-N). As one example, a path field of a message in a particular stream includes a stream identification. A particular receiver or multiple receivers in a receiver group can be pre-registered with cloud gateway 340 to be a receiver or receivers for receiving data streams with a particular stream identification. The receiver registration information is represented or included in, for example, a routing table. As a result, the stream identification included in the path field of a message and the receiver registration information can be used by cloud gateway 340 to identify the particular receiver or receivers in a receiver group for receiving the particular data stream. Similarly, using destination information and a routing table, cloud gateway 340 can also identify one or more service agents 352A-N for receiving particular data streams. In some examples, the routing table, which includes the receiver registration information, is stored in cloud configuration resources 358 accessible by cloud gateway 340.

In some embodiments, a receiver group including one or more receivers is associated with a data stream delivery policy. Different receiver groups can have different delivery policies. A cloud gateway can obtain the delivery policy associated with a particular data stream. The delivery policy can be, for example, a wait-for-all policy, a wait-for-any policy, or a wait-for-none policy. In some embodiments, cloud gateway 340A deliveries different data streams to different receiver groups based on different delivery policies. This capability of cloud gateway 340A can improve the data delivery efficiency and flexibility because it enables multiple data streams to be multiplexed for delivery while allowing customization of the delivery policies on a per-stream basis. Thus, any single end-to-end data stream delivered from a particular data collector operating in the client computing environment to a particular receiver operating in the cloud-services computing environment can be customized for a particular delivery policy.

In some embodiments, multiple receivers in receiver groups 350A-N are instantiated by cloud service stream manager 354. Cloud service stream manager 354 can be a system or component separate from cloud gateway 340 or integrated with cloud gateway 340. In some embodiments, cloud service stream manager 354 determines the topics and partitions associated with each receiver in receiver groups 350A-N and instantiates the receivers accordingly. Such determination can be based on configurations such as subscribed topics stored in cloud configuration resources 358. As an example, cloud service stream manager 354 can determine the subscribed topics based on known subscribers 348A-N. A subscriber can be an application or cloud computing service provider that consumes data (e.g., messages) for any purposes. For example a subscriber is a cloud-based application that performs analysis on the subscribed data to provide optimization suggestions to the client. A subscriber can also be a software-as-a-service application that performs a task requested by the client. Thus, with the knowledge of subscribers and their subscribed topics, cloud service stream manager 354 can determine the corresponding topics/partitions in receiver groups 350A-N and the number of the receivers required. Cloud service stream manager 354 can thus instantiate the receivers with the appropriate topics and partitions.

With reference to FIG. 3B, in some embodiments, cloud gateway 340 routes or deliver multiple data streams to multiple destinations (e.g., receivers or service agents) in a predetermined order. In some embodiments, the data streams are routed or delivered based on the order they are received at the cloud gateway 340. For instance, if cloud gateway 340 receives data streams 362 before data streams 364, cloud gateway 340 can correspondingly route data streams 362 to receiver groups 350 before routing data streams 364 to service agents 352.

In some embodiments, multiple data streams are routed or delivered in accordance with a predefine order determined based on priorities associated with one or more subscribers. For instance, with reference to FIG. 3B, service agents 352 includes one or more applications that consume time-sensitive data and thus may have a higher priority than subscribers 348A-N, which can pull data from receiver group 350A-N as needed. As a result, cloud gateway 340 can deliver data streams 364 before delivering data stream 362, or deliver messages of data streams 364 as a priority over messages of data streams 362 (e.g., delivering messages of data streams 364 they are received while delaying the delivery of messages of data streams 362 because they are less time sensitive).

In some embodiments, multiple data streams are routed or delivered dynamically based on one or more network-related conditions. For example, depending on availability of certain receivers or service agents, or depending on bandwidth availability, the routing or delivering of data streams 362 and 364 can be prioritized dynamically to optimize or improve overall operational efficiency.

In some embodiments, cloud-services computing environment 220 includes one or more services such as pipeline service 344, provisioning service 346, inventory service 368, or the like. Pipeline service 344 is a service that facilitates processing and movement of data (e.g., messages in data streams) between different components of cloud-services computing environment 220 (e.g., between persisting storage 370 and other services, or between services). Provisioning service 346 is a service that facilitates allocation of cloud-based resources and services to one or more systems in one or more client computing environments (e.g., the systems in client computing environment 210). Inventory service 368 collects inventory information such as information about the networks, storage, and virtual machines resources. In some examples, one or more services (e.g., 344, 346, and 368) can transmit commands to cloud gateway 340. For instance, provisioning service 346 can push commands to resources manager 356, which then forward the commands to cloud gateway 340. Cloud gateway 340 can further deliver the commands to systems in client computing environment 210 via a secured connection. Techniques for delivering commands from a cloud-services computing environment to a client computing environment in a fast, reliable, and secure manner are described in greater detail below, with reference to FIGS. 4 and 5.

Figure 4:
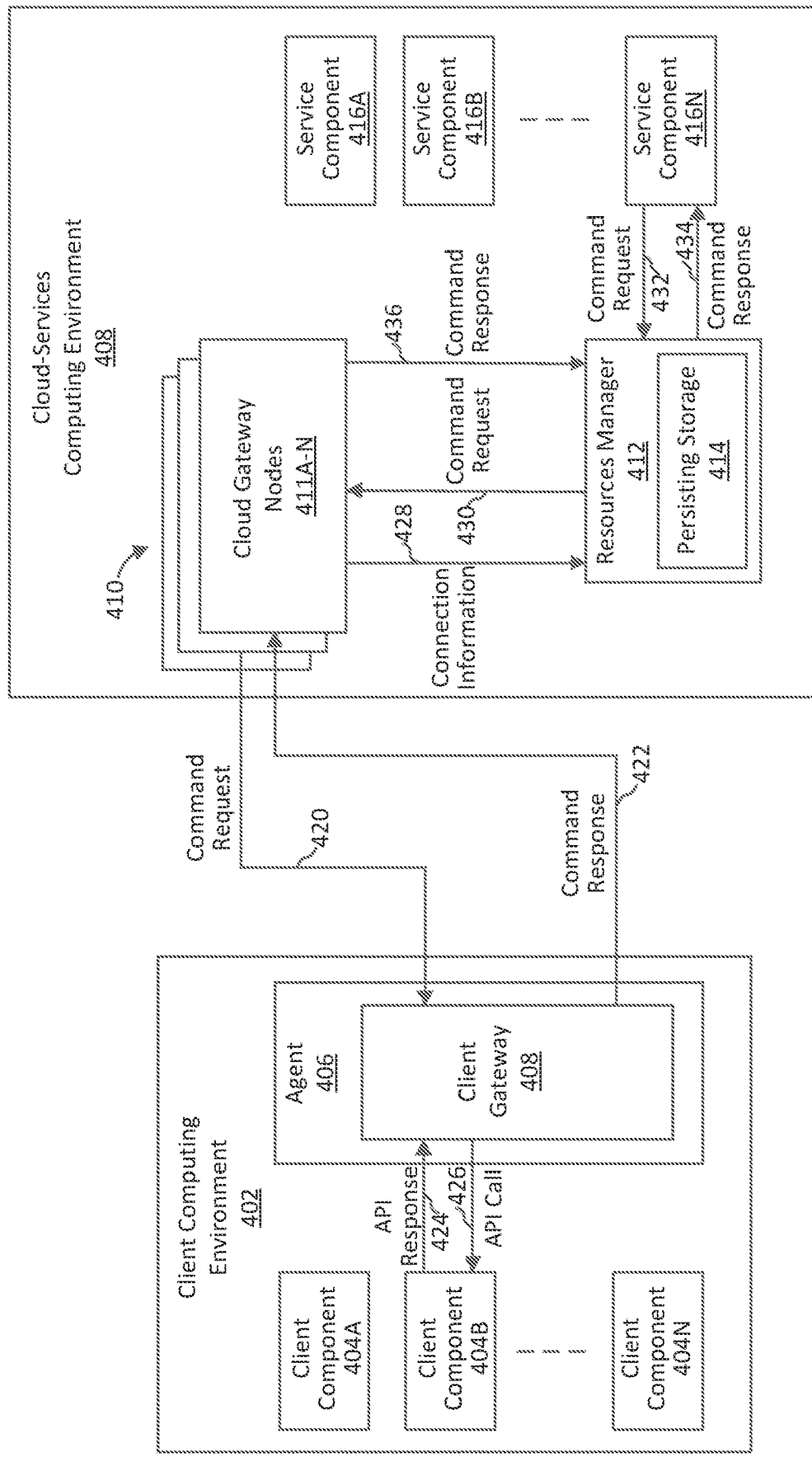
FIG. 4 is a block diagram illustrating systems and environments that support bidirectional command protocols via a unidirectional communication connection across a client computing environment and a cloud-services computing environment, according to some embodiments.

FIG. 4 illustrates systems and environments that support bidirectional command protocols via unidirectional communication connection 420, according to some embodiments. As shown, client computing environment 402 is in communication with cloud-services computing environment 408 (e.g., via one or more networks, such as network 218). Client computing environment 402 and cloud-services computing environment 408 are similar or the same as client computing environment 210 and cloud-services computing environment 220, respectively (FIGS. 2, 3A, and 3B). Cloud-services computing environment 408 delivers various cloud services over the Internet to client computing environment 402. For example, cloud-services computing environment 408 provides software, platform, or infrastructure services to client computing environment 402. In the present embodiment, these services are provided by service components 416A-N. Service components 416A-N include, for example, receivers (e.g., receiver groups 350A-N), service agents (e.g., service agents 352A-N), provisioning services (e.g., provisioning service 346), pipeline services (e.g., pipeline service 344), or the like. Data is exchanged between service components 416A-N and client computing environment 402 in the course of providing cloud services to client computing environment 402. Cloud gateway 410 (similar to cloud gateway 340) and resources manager 412 (similar to resources manager 356) are configured to manage and route the data between service components 416A-N and client computing environment 402. Cloud gateway 410 includes a plurality of cloud gateway nodes 411A-N that implement the functions of cloud gateway 410.

Client computing environment 402 includes agent 406 and client components 404A-N. Agent 406 hosts client gateway 408 (similar to client gateway 408), which is configured to establish secure communication connections (e.g., 420 and 422) with cloud gateway 410. The secure communication connections are established via a wide area network (e.g., network 218), such as the Internet. Client gateway 408 and cloud gateway 410 are configured to route and distribute data (e.g., HTTP messages) from client components 404A-N to other client components or data receivers within client computing environment 402 as well as to service components 416A-N or data receivers in cloud-services computing environment 408 (via the secure communication connections and using cloud gateway 410). Client gateway 408 and cloud gateway 410 are further configured to route and execute commands that are pushed from service components 416A-N and directed to client components 404A-N (via resources manager 412, cloud gateway 410, and the secure communication connections).

In some embodiments, agent 406 is a standalone application (e.g., JAVA application) implemented on a computing system, such as a VM or container. In some embodiments, agent 406 is a forwarder, such as forwarder 230. Client components 404A-N utilize the cloud-services provided by service components 416A-N. In some embodiments, client components 404A-N include data collectors (e.g., data collectors 322A-N), tenant systems (e.g., tenant systems 310), or the like. Client gateway 408 of agent 406 facilitates the exchange of data between client components 404A-N and service components 416A-N. In some embodiments, client gateway 408 is implemented as a software development kit (SDK) running on agent 406.

During start-up, client gateway 408 sends (e.g., via one or more networks, such as network 218) one or more connection requests to cloud gateway 410. The one or more connection requests include, for example, a request to establish a unidirectional communication connection (e.g., server-sent events session) and a request to establish a bidirectional communication connection (e.g., HTTP persistent connection). Cloud gateway 410 receives the one or more connection requests (e.g., at a public IP address of cloud gateway 410) and authenticates the one or more connection requests based on authentication information contained in the one or more connection requests. Upon successful authentication of the one or more connection requests, one or more corresponding communication connections are established between client gateway 408 and cloud gateway 410.

In the present embodiment of FIG. 4, cloud gateway 410 establishes bidirectional communication connection 422 upon successfully authenticating the request to establish a bidirectional communication connection. Bidirectional communication connection 422 allows request-response communication protocols that are initiated by client gateway 412 to be completed. In some embodiments, client gateway 408 does not accept request messages initiated by cloud gateway 410 via the bidirectional communication connection. For example, a client firewall of the client gateway blocks such request messages from cloud gateway 410. In some embodiments, bidirectional communication connection 420 is a HTTP persistent connection (e.g., HTTP keep-alive connection). In some embodiments, bidirectional communication connection 420 is part of a data ingestion pipeline. For example, bidirectional communication connection 420 enables data ingestion requests initiated at client computing environment 402 to be sent from client gateway 408 to cloud gateway 410, which routes associated data messages to a data receiver (e.g., service components 416A-N of cloud-services computing environment).

As shown in FIG. 4, cloud gateway 410 establishes unidirectional communication connection 420 upon successfully authenticating the request to establish a unidirectional communication connection. Unidirectional communication connection 420 is established, for example, at a first gateway node of cloud gateway 410. In some embodiments, unidirectional communication connection only permits data messages to be transmitted in one direction. For example, unidirectional communication connection 420 allows messages to be sent from cloud gateway 410 to the client gateway 408, but does not permit messages to be sent from client gateway 408 to cloud gateway 410. More specifically, unidirectional communication connection 420 enables command request messages initiated from cloud-services computing environment 408 to be pushed to and executed in client computing environment 402, thereby enabling the performance of remote management tasks, for example. In some embodiments, unidirectional communication connection 420 is an established/open SSE session.

Upon establishing unidirectional communication connection 420, connection information associated with the established unidirectional communication connection is provided to resources manager 412 (as represented by arrow 428), where the connection information is stored in persisting storage 414. The connection information maps identification information (e.g., agent ID) of client gateway 408 to routing information (e.g., IP/port address) of the first gateway node at which the unidirectional communication connection 420 is established. The connection information, for example, instructs resources manager 412 to route any command request messages addressed to client gateway 408 via the first gateway node of cloud gateway 410 and unidirectional communication connection 420.

In some embodiments, prior to establishing unidirectional communication connection 420, resources manager 412 stores a plurality of pending command request messages at persisting storage 414. Upon establishing unidirectional communication connection 420 and in accordance with the request to establish the unidirectional communication connection, one or more of the plurality of pending command request messages are pushed via unidirectional communication connection 420 to client gateway 408. Client gateway 408 then processes the one or more pending command request messages. In some embodiments, resources manager 412 includes a predefined priority policy stored in persisting storage 414. Resources manager 412 applies the priority policy to determine which of the plurality of pending command request messages should be sent to client gateway 408 and in what order.

In some embodiments, after unidirectional communication connection 420 is established, a user initiates a command from the cloud-services computing environment 408 to cause one or more components (e.g., client components 404A-N) of the client computing environment to perform one or more tasks (e.g., remote management tasks). For example, a user connects to service component 416N (e.g., via a client terminal) and causes service component 416N to generate a command request message. In the present embodiment, the command request message is a request to cause client component 404B to perform one or more tasks. For example, the command request message is a request to cause client component 404B to execute a query, to update one or more operating parameters, change an operating state of the client component, provide a status update, or the like. The command request message includes routing information indicating a location (e.g., URL or IP address) or identification (e.g., component ID) of client component 404B. In the present embodiment, the command request message includes a request for client gateway 332 to provide client component 404B with instructions (e.g., application programming interface (API) call) to perform one or more tasks. In other embodiments, the command request message includes a request for client component 404B to perform one or more tasks. In some embodiments, the command request message is generated after the unidirectional communication connection is established at block 504.

As shown in FIG. 4, service component 416N establishes a communication connection with an open port of resources manager 412 and sends (as represented by arrow 432) the command request message to resources manager 412 via the communication connection. In some embodiments, the port remains open after sending the command request message. For example, service component 416N instructs resources manager 412 to leave the port open until a response to the command request message is returned. Upon receiving the command request message, resources manager 412 embeds a token in the command request message. The token includes routing information that enables cloud gateway 410 to route a command response message back to the service component. For example, the token includes the IP address and port number of the open port at which resources manager 412 received the command request message from service component 416N.

Resources manager 412 determines where to route the command request message. For example, resources manager 412 determines, based on routing information (e.g., URL or IP address) in the command request message, that the command request message is addressed to client gateway 408. Based on this determination, resources manager 412 obtains identification information (e.g., agent ID) associated with client gateway 408 and determines which cloud gateway node to send the command request message. For example, resources manager 412 accesses the connection information stored in persisting storage 414 to map the agent ID associated with client gateway 408 to the corresponding IP/port address of the first gateway node at which unidirectional communication connection 420 is established. In some embodiments, resources manager 412 then obtains, from the first cloud gateway node, information regarding the state of unidirectional communication connection 420. In accordance with determining, based on the obtain information, that the state of the unidirectional communication connection is open, resources manager 412 sends (as represented by arrow 430) the command request message (e.g., in real time) with the embedded token to the first cloud gateway node. For example, resources manager 412 sends the command request message to the determined IP/port address of the first cloud gateway node.

Conversely, in accordance with determining that the state of the unidirectional communication connection is not open, resources manager 412 stores the command request message in persisting storage 414 and forgoes sending the command request message to the first cloud gateway node. In some embodiments, the command request message is placed in a queue with other pending command request messages awaiting for unidirectional communication connection 420 to open. For example, resources manager 412 periodically obtains from the first cloud gateway node updated information regarding the state of unidirectional communication connection 420. Upon detecting, at a later time, that the state of the unidirectional communication connection changes from not open to open, resources manager 412 sends the stored command request message to the first cloud gateway node. In some embodiments, the stored command request message is sent with other pending command request message in accordance with a predefined priority policy.

Upon receiving the command request message, the first cloud gateway node forwards the command request message to client gateway 408 via unidirectional communication connection 420. Client gateway 408 executes the command request message and causes client component 404B to perform one or more corresponding tasks. For example, the command request message includes an HTTP request to invoke an API call (as represented by arrow 426) to client component 404B. The API call is, for example, a service request for client component 404B to query, add, update, replicate, or delete data/metadata, perform administrative tasks (e.g., run utilities), change/provide an operating state, update one or more operating parameters, or the like. Client gateway 408 executes the HTTP request to invoke the API call to client component 404B. Upon completing the API call, client component 404B returns an API response (as represented by arrow 424) to client gateway 408. The API response confirms, for example, that the API call is successfully processed by client component 408. In some embodiments, the API response includes data associated with processing the API call. For example, the API response includes data obtained by client component 404B as a result of completing one or more tasks represented by the API call.

Upon receiving the API response, client gateway 408 generates a command response message that includes the data in the API response. The command response message includes the token embedded in the command request message. For example, client gateway 408 embeds the token in the command response message in accordance with instructions in the command request message. Client gateway 408 then sends the command response message to cloud gateway 410 via bidirectional communication connection 422 (not via unidirectional communication connection 420).

Cloud gateway 410 receives the command response message from client gateway 408. In some embodiments, the command response message is received at a second cloud gateway node different from the first cloud gateway node. In some embodiments, the command response message is in the form of an ingestion request message (e.g., HTTP request) that is initiated by client gateway 408 and that serves as a response to the command request message received by client gateway 408 via bidirectional communication connection 422. In some embodiments, in response to receiving the command response message, cloud gateway 410 returns, via bidirectional communication connection 422, a response message to client gateway 406 acknowledging receipt of the command response message. The response message completes the request-response protocol on bidirectional communication connection 422.

Upon receiving the command response message, cloud gateway 410 obtains routing information from the token embedded in the command response message to determine where the received command response message should be routed to. For example, the obtained routing information (e.g., IP address and port number) includes the IP address and port number of resources manager 412 at which the command request message was received from service component 416. Cloud gateway 410 sends (as represented by arrow 436) the command response message in accordance with the obtained routing information. It should be appreciated that because command response message is received via bidirectional communication connection 422 that is different from unidirectional communication connection 420 that command request message was sent (and at a different cloud gateway node), cloud gateway 410 may not know where to route the command response message without the embedded token in the command response message. Thus, embedding the token in the command request message and the command response message can enable the command response message to be returned to the services component that initiated the command request message.

Resources manager 412 forwards (as represented by arrow 434) the command response message received from cloud gateway 410 to service component 416N. The command response message is sent, for example, via the same communication connection (e.g., same port) at which the command request message was received from service component 416N. In some embodiments, the command response message serves as an HTTP response to the command request message received from service component 416N and completes the request-response protocol. Service component 416N, for example, causes the communication connection (and the associated port of resources manager 412) to close upon receiving the command response message.

Figure 5A:
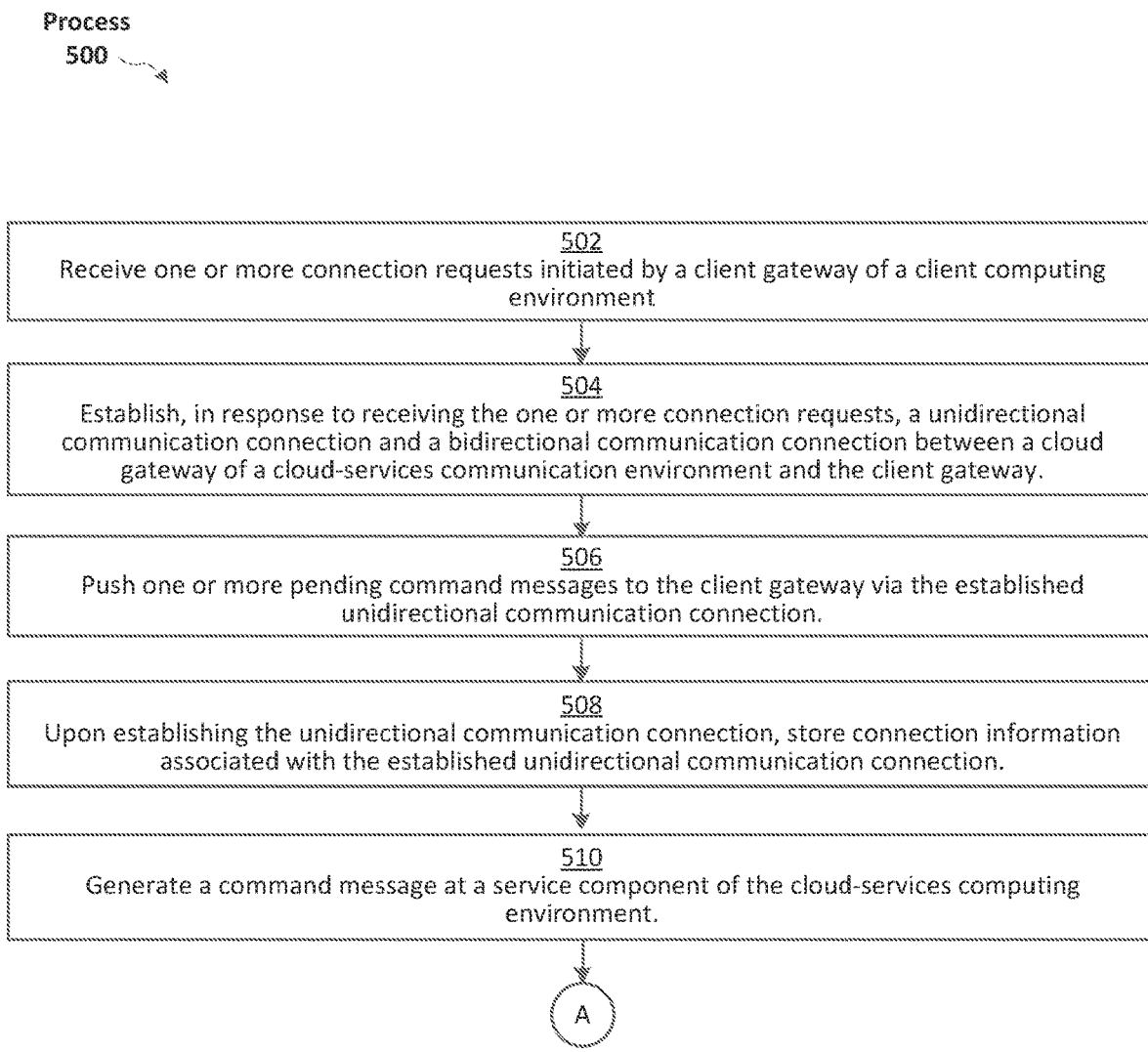

FIGS. 5A-5B illustrate a flowchart of exemplary process 500 for handling bidirectional command protocols via a unidirectional communication connection between two computing environments, according to some embodiments. For example, process 500 can be used to handle request-response command protocols that are initiated by one or more cloud service components in a cloud-services computing environment and directed to one or more client components in a client computing environment. The one or more client components are, for example, behind a client firewall. In some embodiments, process 500 is performed using the systems and environments described above in FIG. 4. For example, the operations of process 500 described below are performed by one or more systems (e.g., cloud gateway, service component, resources manager, etc.) of a cloud-services computing environment (e.g., cloud-services computing environment 408 of FIG. 4). In process 500, some blocks are, optionally, combined, the order of some blocks is, optionally, changed, and some blocks are, optionally, omitted. In some embodiments, additional operations may be performed with any combination of operations (or sub-operations) in process 500.

At block 502, one or more connection requests are received (e.g., at cloud gateway 410). The one or more connection requests are initiated by and received from a client gateway (e.g., client gateway 408) of a client computing environment. In some embodiments, the one or more connection requests are received at the time the client gateway is starting up. In some embodiments, the one or more connection requests are received at a public IP address (or public URL) of the cloud gateway. In some embodiments, the one or more connection requests are in the form of HTTP requests. The one or more connection requests include, for example, a request to establish a unidirectional communication connection. For example, the request to establish a unidirectional communication connection is an HTTP request to open an SSE session. In some embodiments, the one or more connection requests further include a request to establish a bidirectional communication connection. For example, the request to establish a bidirectional communication connection is an HTTP request to open an HTTP persistent connection (e.g., HTTP keep-alive connection). In some embodiments, the one or more connection requests do not include a request to establish a virtual private network (VPN) connection.

At block 504, in response to receiving the one or more connection requests of block 502, a unidirectional communication connection and a bidirectional communication connection are established between the cloud gateway and the client gateway. The established unidirectional communication connection allows messages to be pushed from the cloud-services computing environment to the client computing environment (via the cloud gateway and the client gateway), but does not permit any communication in the other direction after the initial request to establish the unidirectional communication connection is received. For instance, in some embodiments, the unidirectional communication connection does not permit subsequent requests to be sent from the client gateway to the cloud gateway after the initial request. The unidirectional communication connection also does not permit a response message to be returned from the client gateway to the cloud gateway in response to a message pushed from the cloud gateway to the client gateway. In some embodiments, the unidirectional communication connection does not close after a message is pushed from the cloud-services computing environment to the client computing environment. For example, the established unidirectional communication connection is an open SSE session. In some embodiments, the unidirectional communication connection is not an AJAX polling or long-polling connection, which requires periodic client requests to restart the connection (and results in higher latency and greater HTTP overhead).

In some embodiments, the cloud gateway includes a plurality of gateway nodes. A load balancer of the cloud-services computing environment is associated with the plurality of gateway nodes. In particular, the load balancer determines, based on the network load of each gateway note, which gateway node(s) of the plurality of gateway nodes should process the one or more connection requests of block 502. In some embodiments, based on a determination by the load balancer, the unidirectional communication connection is established between a first gateway node of the plurality of gateway nodes and the client gateway. In some embodiments, the bidirectional communication connection is established on a different gateway node than the first gateway node.

In some embodiments, the established bidirectional communication connection allows request-response communication protocols to be completed. Specifically, the established bidirectional communication connection allows request messages initiated at the client computing environment to be sent from the client gateway to the cloud gateway and allows a corresponding response message from the cloud-services computing environment to be sent back to the client gateway. However, in some embodiments, the client gateway does not accept request messages initiated by the cloud-services computing environment and received via the bidirectional communication connection. For example, a client firewall of the client gateway blocks such request messages from the cloud gateway. Thus, in these embodiments, request messages initiated at the cloud-services computing environment cannot be sent from the cloud gateway to the client gateway through the bidirectional communication connection. In some embodiments, the bidirectional communication connection is persistent where the connection remains open after each request-response message pair is exchanged. For example, the bidirectional communication connection is an HTTP persistent connection (also referred to as HTTP keep-alive or HTTP connection reuse). In some embodiments, the bidirectional communication connection allows for multiple concurrent requests-responses to be multiplexed over a single connection.

In some embodiments, the bidirectional communication connection is part of a data ingestion pipeline configured to transmit streams of collected data from the client computing environment to the cloud-services computing environment for real-time distribution. For example, as described above with reference to FIGS. 3A-3B, during data ingestion, a plurality of messages each assigned to a data stream are pushed from the client gateway to the cloud gateway via the bidirectional communication connection. Based on the assigned data stream(s), the cloud gateway routes the plurality of messages to respective data receivers of the cloud-services computing environment.

At block 506, upon establishing the unidirectional communication connection, one or more pending command request messages are pushed to the client gateway via the unidirectional communication connection. For example, prior to establishing the unidirectional communication connection, a plurality of pending command request messages directed to the client computing environment were generated by one or more service components (e.g., service components 416A-N) of the cloud-services computing environment and stored at a resources manager (e.g., at persisting storage 414) of the cloud-services computing environment stores. The plurality of pending command request messages were stored as a result of a failure (e.g., network communication failure, system component failure, or the like) that prevented the plurality of pending command request messages from being pushed to the client computing environment at the time the pending command request messages were generated. Establishing the unidirectional communication connection causes one or more of the plurality of pending command request messages to be pushed to the client gateway via the unidirectional communication connection. For example, the request to establish the unidirectional communication connection (block 502) includes a "GET" command that causes one or more of the plurality of pending command request messages to be sent to the client gateway via the unidirectional communication connection upon establishing the unidirectional communication connection.

In some embodiments, the resources manager includes a predefined priority policy (e.g., stored in persisting storage 414). The resources manager applies the priority policy to determine which of the plurality of pending command request messages should be sent to the client gateway and in what order. In some embodiments, the priority policy includes a plurality of rules and/or models that are based on factors such as the network load of the various components in the cloud-services computing environment, the client component to which the pending command request messages are directed, the time at which each pending command request message was generated, or the like.

In some embodiments, based on the priority policy, a determination is made (e.g., by the resources manager) that at least two pending command request messages of the plurality of pending command request messages are to be pushed to the client gateway via the unidirectional communication connection. Moreover, an order in which the at least two pending command request messages are to be pushed to the client gateway is determined (e.g., by the resources manager) based on the priority policy. In accordance with these determinations, the at least two pending command request messages are pushed to the client gateway via the unidirectional communication connection and according to the determined order. In some embodiments, the determined order is different from the order in which the at least two pending command request messages were generated by the service components (e.g., service components 416A-N) or received by the resources manager.

In some embodiments, based on the priority policy, a determination is made (e.g., by the resources manager) that at least one pending command request message of the plurality of pending command request messages is not to be pushed to the client gateway via the unidirectional communication connection. In accordance with this determination, process 500 forgoes pushing the at least one pending command request message to the client gateway via the unidirectional communication connection.

At block 508, upon establishing the unidirectional communication connection, connection information associated with the established unidirectional communication connection is stored. The connection information is stored, for example, by a resources manager (e.g., at persisting storage 414) of the cloud-services computing environment. The connection information includes, for example, identification information of the client gateway and routing information (e.g., IP/port address) to the first gateway node. The identification information includes, for example, the agent ID hosting the client gateway or the IP/port address of the client gateway. The routing information includes, for example, address information (e.g., URL, or IP address) or identification information that enables the resources manager to forward command request messages to the first gateway node. The address information, for example, indicates the address of the cloud gateway port where the unidirectional communication connection is open (e.g., IP/port address of the first gateway node).

At block 510, a command request message is generated by a service component (e.g., one of service components 416A-N) of the cloud-services computing environment. The command request message is directed to a client component (e.g., one of client components 404A-N) of the client computing environment. For example, the command request message includes routing information indicating a location (e.g., URL or IP address) or an identification of the client component in the client computing environment. In some embodiments, the command request message includes a request for causing the client component to perform one or more tasks. For example, the command request message is a request for causing the client component to execute a query, to update one or more operating parameters, change an operating state of the client component, provide a status update, or the like. In some embodiments, the command request message is generated after the unidirectional communication connection is established at block 504.

At block 512, in accordance with a determination that the unidirectional communication connection is open, the command request message is pushed (e.g., from the service component) to the client gateway via the unidirectional communication connection. Pushing the command request message to the client gateway includes, for example, pushing the command request message from the service component to the resources manager. The resources manager receives the command request message from the service component via a communication connection established between the service component and the resources manager (e.g., at an open port of the resources manager). Upon receiving the command request message, the resources manager uses the stored connection information of block 508 to forward the command request message to the first gateway node at which the unidirectional communication connection is established. The first gateway node then sends the command request message to the client gateway via the unidirectional communication connection. In some embodiments, the resources manager stores a copy of the command request message (e.g., at persisting storage 414) to enable recovery in the event of a failure event that prevents the command request message from being successfully pushed to the client gateway.

In some embodiments, a token is embedded (e.g., by resources manager 412) in the command request message with associated instructions. The token indicates, for example, routing information that enables the cloud gateway to route a corresponding command response message back to the service component. The associated instructions direct the client gateway to embed the token in the command response message. In some embodiments, the cloud gateway does not close the unidirectional communication connection upon sending the command request message to the client gateway. The unidirectional communication connection thus remains open after pushing the command request message to the client gateway. In some embodiments, block 512 includes one or more operations of blocks 514-522, described below.

At block 514, a state of the unidirectional communication connection is determined at a first time (e.g., by resources manager 412). For example, the resources manager receives the command request message from the service component at an open port of the resources manager. In response to receiving the command request message, the resources manager determines from the routing information (e.g., URL or IP address) defined in the command request message that the command request message is to be sent to the client gateway. Based on the agent ID associated with the client gateway and the stored connection information, the resources manager determines that the command request message should be routed to the first gateway node, where it will be forwarded to the client gateway via the unidirectional communication connection. The resources manager then obtains, at the first time, state information from the cloud gateway to determine whether the unidirectional communication connection at the first gateway note is open (e.g., available to transmit the command request message) or not open (e.g., disconnected, unavailable, in the process of reconnecting, etc.).

At block 516, in accordance with a determination, at the first time, that the state of the unidirectional communication connection is open, the command request message is sent (e.g., by resources manager 412) to the first gateway node based on the connection information. For example, the resources manager sends the command request message (e.g., in real time) to a IP/port address of the first gateway node in accordance with the stored connection information.

In some embodiments, prior to sending the command request message to the first gateway node, the resources manager embeds the token in the command request message. As briefly discussed above, the token includes routing information that enables the cloud gateway to route a received command response message back to the service component. For example, the routing information includes the IP address and port number of the open port at which the resources manager received the command request message from the service component. In some embodiments, the resources manager further embeds associated instructions in the command request message. The associated instructions direct the client gateway to embed the token in a corresponding command response message returned to the cloud gateway. In some embodiments, the port of the resources manager remains open until a response to the command request message is returned from the resources manager to the service component via the open port.

At block 518, in accordance with a determination, at the first time, that the state of the unidirectional communication connection is not open, the command request message is stored (e.g., at persisting storage 414) waiting for the unidirectional communication connection to open. For example, the resources manager forgoes sending the command request message to the first gateway node in accordance with a determination that the state of the unidirectional communication connection is not open. In some embodiments, the stored command request message is placed in a queue as part of a plurality of pending command request messages to be sent to the client gateway. The priority of the stored command request message in the queue is determined, for example, according to a priority policy as described above with respect to the pending command request messages.

At block 520, upon detecting, at a second time after the first time, a change in the state of the unidirectional communication connection from not open to open, the stored command request message is sent (e.g., by resources manager 412) to the first gateway node based on the stored connection information. In some embodiments, the stored command request message is sent in accordance with a determined order with respect to a plurality of stored pending command request messages.

At block 522, upon receiving the command request message (or the stored command request message) from the resources manager, the first gateway node sends the command request message to the client gateway via the unidirectional communication connection. It should be appreciated that stored command request messages (from blocks 518 and 520) are not sent to the client gateway in real time as a result of the delay caused by the unidirectional communication connection not being open for a period of time.

The command request message (or the stored command request message), when received by the client gateway, causes the client gateway to execute the command request message and obtain data from the client component. For example, the command request message includes an HTTP request to invoke an API call to the client component. The API call is, for example, a service request for the client component to query, add, update, replicate, or delete data/metadata, perform administrative tasks (e.g., run utilities), change/provide an operating state, update one or more operating parameters, or the like. The client gateway executes the HTTP request to invoke the API call to the client component. Upon completing the API call, the client component returns an API response to the client gateway. The API response confirms, for example, that the API call is successfully processed by the client component. In some embodiments, the API response includes data associated with processing the API call. For example, the API response includes data obtain from the client component performing one or more tasks represented by the API call. Upon receiving the API response, the client gateway generates a command response message that includes the data from the client component. The command response message includes the token discussed above in block 512. For example, the client gateway embeds the token in the command response message in accordance with instructions in the command request message (as discussed above in block 512). The client gateway then sends the command response message to the cloud gateway via the bidirectional communication connection established at block 504.

At block 524, the command response message is received (e.g., by cloud gateway 410) from the client gateway via the bidirectional communication connection of block 504. The command response message serves as a response to the command request message sent via the unidirectional communication connection. As discussed above, in some embodiments, the command response message includes the token of block 512. The command response message also includes data associated with executing the command request message (e.g., data obtained from processing the API call). In some embodiments, the bidirectional communication connection is established between the client gateway and the second gateway node of the cloud gateway. In these embodiments, the command response message is received at the second gateway node.

In some embodiments, the bidirectional communication connection is part of an ingestion pipeline. The command response message is, for example, in the form of an ingestion request message (e.g., HTTP request) that is initiated by the client gateway. In some embodiments, in response to receiving the command response message, a response is returned (e.g., by cloud gateway 410) to the client gateway. The response is, for example an ingestion response message (e.g., HTTP response) corresponding to the ingestion request message. The response acknowledges receipt of the ingestion request message and completes the request-response protocol on the bidirectional communication connection. In some embodiments, the bidirectional communication connection persists (e.g., remains open) after the cloud gateway receives the ingestion request message and after a corresponding response is returned to the client gateway.

At block 526, a command response message is sent to the service component based on the token. For example, the command response message is routed to the service component using the cloud gateway and the resources manager. In some embodiments, upon receiving the command response message at block 524, the cloud gateway processes the routing information in the embedded token of the command response message and sends the command response message to the open port of the resources manager in accordance with the routing information (e.g., the IP address and port number of the open port). In particular, based on the routing information in the token, the command response message is sent to the same port of the resources manager at which the command request message was received from the service component. The resources manager then sends the command response message to the service component via the communication connection previously established with the service component at the open port of the resources manager. The command response message serves as an HTTP response to the previous command request message from the service component and completes the request-response protocol. As discussed above, in some embodiments, the communication connection between the service component and the resources manager remains open at least until the resources manager sends the command response message to the service component. In some embodiments, the communication connection (and the associated port of the resources manager) closes upon sending the command response message to the service component.

It should be appreciated that process 500 enables a service component of the cloud-services computing environment to utilize a request-response protocol to send command messages to a client computing environment and receive corresponding responses despite the client computing environment implementing a firewall that that would conventionally block such command messages. In particular, the use of a secure unidirectional communication connection to push command messages to the client computing environment and a separate secure bidirectional communication connection to receive the corresponding response enables the request-response protocols to be completed securely, reliably, and with low latency. Moreover, the dual use of the secure bidirectional communication connection for ingesting streams of data messages and returning command response messages to the cloud-services computing environment enables a single platform (e.g., platform of FIG. 4 implemented a client gateway and a cloud-services gateway) to support the point-to-point distribution of data streams and commands in a fast, secure, and reliable manner between different computing environments.

Although the techniques associated with FIG. 4 are described in the context of a client computing environment and a cloud-services computing environment, it should be appreciated that the techniques can similarly be applied to any two (or more) computing environments where a first computing environment exposed to a public network (e.g., has a public IP address) is used to send a command request message to a second computing environment not exposed to the public network (e.g., private network behind a firewall) and to obtain a command response message associated with executing the command request message at the first computing environment.

In accordance with some implementations, a computer-readable storage medium (e.g., a non-transitory computer readable storage medium) is provided. The computer-readable storage medium stores one or more programs for execution by one or more processors of a computing system (e.g., distributed computing system), the one or more programs including instructions for performing any of the methods or processes described herein. The computer-readable storage medium is, for example, distributed across a plurality of memory storage devices of a plurality of computing systems in a computing environment (e.g., a cloud-services computing environment).

In accordance with some implementations, a computing system (e.g., distributed-computing system) is provided that comprises means for performing any of the methods or processes described herein.

In accordance with some implementations, a computing system (e.g., distributed-computing system) is provided that comprises one or more processors and memory storing one or more programs for execution by the one or more processors, the one or more programs including instructions for performing any of the methods or processes described herein.

The foregoing descriptions of specific embodiments have been presented for purposes of illustration and description. They are not intended to be exhaustive or to limit the scope of the claims to the precise forms disclosed, and it should be understood that many modifications and variations are possible in light of the above teaching.

What is claimed is:

1. A method for handling request-response command protocols using a unidirectional communication connection between a first gateway of a first computing environment and a second gateway of a second computing environment, the method comprising:

at the first computing environment:
establishing, in response to receiving one or more connection requests initiated by the second gateway, the unidirectional communication connection and a bidirectional communication connection between the first gateway and the second gateway, wherein the unidirectional communication connection carries all request messages initiated by the first gateway but does not permit response messages to be returned from the second gateway to the first gateway;

generating, by a first component of the first computing environment, a command request message directed to a second component of the second computing environment;

in accordance with determining that the unidirectional communication connection is open, pushing, from the first component to the second gateway, the command request message via the unidirectional communication connection, wherein a token indicating routing information to the first component is embedded in the pushed command request message and wherein the second gateway does not accept request messages that are initiated by the first computing environment and received via the bidirectional communication connection;

receiving, at the first gateway via the bidirectional communication connection, a command response message from the second gateway, wherein the command response message includes the token and data associated with executing the command request message at the second computing environment, wherein the data is log data or application data generated by the second computing environment; and sending, based on the token, the command response message to the first component.

2. The method of claim 1, wherein the first gateway comprises a plurality of gateway nodes, wherein the unidirectional communication connection is established between the second gateway and a first gateway node of the plurality of gateway nodes, and wherein the method further comprises:

upon establishing the unidirectional communication connection, storing, at a resources manager of the first computing environment, connection information associated with the established unidirectional communication connection, the connection information including identification information of the second gateway and second routing information to the first gateway node.

3. The method of claim 2, further comprising:
at the resources manager:
in response to receiving the command request message from the first service component, determining a state of the unidirectional communication connection; and
in accordance with determining, at a first time, that the state of the unidirectional communication connection is open, sending, based on the connection information, the command request message to the first gateway node, wherein the first gateway node routes the command request message to the second gateway via the unidirectional communication connection.

4. The method of claim 3, further comprising:
in accordance with determining, at the first time, that the state of the unidirectional communication connection is not open:
storing the command request message at the resources manager; and
upon detecting, at a second time after the first time, a change in the state of the unidirectional communication connection from not open to open, sending, based on the connection information, the stored command request message to the first gateway node, wherein the first gateway node routes the stored command request message to the second gateway via the unidirectional communication connection.

5. The method of claim 2, wherein the resources manager receives the command request message from the first component via a communication connection established between the first component and the resources manager, and wherein the communication connection between the first component and the resources manager remains open at least until the resources manager sends the command response message to the first component.

6. The method of claim 2, wherein the first gateway routes the command response message to a port of the resources manager according to the second routing information in the token.

7. The method of claim 1, wherein prior to establishing the unidirectional communication connection, a resources manager of the first computing environment stores a plurality of pending command request messages generated by one or more additional service components of the first computing environment, and wherein the method further comprises:

upon establishing the unidirectional communication connection, pushing at least two pending command request messages of the plurality of pending command request messages to the second gateway via the unidirectional communication connection.

8. The method of claim 7, further comprising:
determining, based on a priority policy stored on the resources manager, an order to push the at least two pending command request messages, wherein the at least two pending command request messages are pushed to the second gateway according to the determined order.

9. The method of claim 8, wherein the resources manager forgoes pushing at least one of the plurality of pending command request messages to the second gateway in accordance with the priority policy.

10. The method of claim 1, wherein the first computing environment is a public computing environment and the second computing environment is a private computing environment.

11. The method of claim 1, wherein the one or more connection requests are received via a public address of the first gateway.

12. The method of claim 1, wherein the bidirectional communication connection is a persistent communication connection that is part of a data ingestion pipeline configured to transfer streams of collected data from the second computing environment to the first computing environment.

13. The method of claim 1, wherein the command request message causes the second gateway to invoke an API call to the second component, and wherein the data is obtained from the second component according to the API call.

14. The method of claim 1, wherein the command request message includes third routing information indicating a location of the second component in the client second computing environment.

15. A non-transitory computer-readable storage medium storing one or more programs configured to be executed by one or more processors of a first computing environment, the first computing environment having a first gateway and a service first component, wherein the one or more programs include instructions for:

establishing, in response to receiving one or more connection requests initiated by the client a second gateway of a second computing environment, a unidirectional communication connection and a bidirectional communication connection between the first gateway and the second gateway, wherein the unidirectional communication connection carries all request messages initiated by the first gateway but does not permit response messages to be returned from the second gateway to the first gateway;

generating, by the first component of the first computing environment, a command request message directed to a second component of the second computing environment;

in accordance with determining that the unidirectional communication connection is open, pushing, from the first component to the second gateway, the command request message via the unidirectional communication connection, wherein a token indicating routing information to the first component is embedded in the command request message, and wherein the second gateway does not accept request messages that are initiated by the first computing environment and received via the bidirectional communication connection;

processing, at the first gateway via the bidirectional communication connection, a command response message from the second gateway, wherein the command response message includes the token and data associated with executing the command request message at the second computing environment, wherein the data is log data or application data generated by the second computing environment; and sending, based on the token, the command response message to the first component.

16. The computer-readable storage medium of claim 15, wherein the first gateway comprises a plurality of gateway nodes, wherein the unidirectional communication connection is established between the second gateway and a first gateway node of the plurality of gateway nodes, and wherein the one or more programs further include instructions for:

upon establishing the unidirectional communication connection, storing, at a resources manager of the first computing environment, connection information associated with the established unidirectional communication connection, the connection information including identification information of the second gateway and second routing information to the first gateway node.

17. The computer-readable storage medium of claim 16, wherein the one or more programs further include instructions for:

in response to receiving the command request message from the first component, determining a state of the unidirectional communication connection; and in accordance with determining, at a first time, that the state of the unidirectional communication connection is open, sending, based on the connection information, the command request message to the first gateway node, wherein the first gateway node routes the command request message to the second gateway via the unidirectional communication connection.

18. The computer-readable storage medium of claim 17, wherein the one or more programs further include instructions for:

in accordance with determining, at the first time, that the state of the unidirectional communication connection is not open:

storing the command request message at the resources manager; and upon detecting, at a second time after the first time, a change in the state of the unidirectional communication connection from not open to open, sending, based on the connection information, the stored command request message to the first gateway node, wherein the first gateway node routes the stored command request message to the second gateway via the unidirectional communication connection.

19. The computer-readable storage medium of claim 16, wherein the first gateway routes the command response message to a port of the resources manager according to the second routing information in the token.

20. The computer-readable storage medium of claim 15, wherein prior to establishing the unidirectional communication connection, a resources manager of the first computing environment stores a plurality of pending command request messages generated by one or more additional service components of the first computing environment, and wherein the one or more programs further include instructions for:

upon establishing the unidirectional communication connection, pushing at least two pending command request messages of the plurality of pending command request messages to the second gateway via the unidirectional communication connection.

21. The computer-readable storage medium of claim 20, wherein the one or more programs further include instructions for:

determining, based on a priority policy stored on the resources manager, an order to push the at least two pending command request messages, wherein the at least two pending command request messages are pushed to the second gateway according to the determined order.

22. A first computing environment implementing a first gateway and a first component, the first computing environment comprising:

one or more processors; and memory storing one or more programs configured to be executed by the one or more processors, the one or more programs including instructions for:

establishing, in response to receiving one or more connection requests initiated by a second gateway of a second computing environment, a unidirectional communication connection and a bidirectional communication connection between the first gateway and the second gateway, the unidirectional communication connection being configured to carry command protocols from the first gateway to the second gateway, wherein the unidirectional communication connection carries all request messages initiated by the first gateway but does not permit response messages to be returned from the second gateway to the first gateway;

generating, by the first component of the first computing environment, a command request message directed to a second component of the second computing environment;

in accordance with determining that the unidirectional communication connection is open, pushing, from the first component to the second gateway, the command request message via the unidirectional communication connection, wherein a token indicating routing information to the first component is embedded in the command request message and wherein the second gateway does not accept request messages that are initiated by the first computing environment and received via the bidirectional communication connection;

processing, at the first gateway via the bidirectional communication connection, a command response message from the second gateway, wherein the command response message includes the token and data associated with executing the command request message at the second computing environment, wherein the data is log data or application data generated by the second computing environment; and sending, based on the token, the command response message to the first component.

23. The computing environment of claim 22, wherein the first gateway comprises a plurality of gateway nodes, wherein the unidirectional communication connection is established between the second gateway and a first gateway node of the plurality of gateway nodes, and wherein the one or more programs further include instructions for:

upon establishing the unidirectional communication connection, storing, at a resources manager of the first computing environment, connection information associated with the established unidirectional communication connection, the connection information including identification information of the second gateway and second routing information to the first gateway node.

24. The computing environment of claim 23, wherein the one or more programs further include instructions for:

in response to receiving the command request message from the first component, determining a state of the unidirectional communication connection; and in accordance with determining, at a first time, that the state of the unidirectional communication connection is open, sending, based on the connection information, the command request message to the first gateway node, wherein the first gateway node routes the command request message to the second gateway via the unidirectional communication connection.

25. The computing environment of claim 24, wherein the one or more programs further include instructions for:

in accordance with determining, at the first time, that the state of the unidirectional communication connection is not open:

storing the command request message at the resources manager; and upon detecting, at a second time after the first time, a change in the state of the unidirectional communication connection from not open to open, sending, based on the connection information, the stored command request message to the first gateway node, wherein the first gateway node routes the stored command request message to the second gateway via the unidirectional communication connection.

26. The computing environment of claim 23, wherein the first gateway routes the command response message to a port of the resources manager according to the second routing information in the token.

27. The computing environment of claim 22, wherein prior to establishing the unidirectional communication connection, a resources manager of the first computing environment stores a plurality of pending command request messages generated by one or more additional service components of the first computing environment, and wherein the one or more programs further include instructions for:

upon establishing the unidirectional communication connection, pushing at least two pending command request messages of the plurality of pending command request messages to the second gateway via the unidirectional communication connection.

28. The computing environment of claim 27, wherein the one or more programs further include instructions for:

determining, based on a priority policy stored on the resources manager, an order to push the at least two pending command request messages, wherein the at least two pending command request messages are pushed to the second gateway according to the determined order.

* * * * *